United States Patent
Rao et al.

(10) Patent No.: US 12,469,067 B2
(45) Date of Patent: Nov. 11, 2025

(54) IMAGE SEGMENTATION AND VECTORIZATION SYSTEM FOR COMPLEMENTARY STYLING PRODUCTS

(71) Applicant: SAP SE, Walldorf (DE)

(72) Inventors: Arjun Rao, Fremont, CA (US); Nick Pendar, San Ramon, CA (US)

(73) Assignee: SAP SE, Walldorf (DE)

( * ) Notice: Subject to any disclaimer, the term of this patent is extended or adjusted under 35 U.S.C. 154(b) by 451 days.

(21) Appl. No.: 18/112,870

(22) Filed: Feb. 22, 2023

(65) Prior Publication Data

US 2024/0281864 A1   Aug. 22, 2024

(51) Int. Cl.
*G06Q 30/0601* (2023.01)
*G06V 10/26* (2022.01)
*G06V 10/764* (2022.01)

(52) U.S. Cl.
CPC ..... *G06Q 30/0631* (2013.01); *G06Q 30/0603* (2013.01); *G06V 10/26* (2022.01); *G06V 10/765* (2022.01)

(58) Field of Classification Search
None
See application file for complete search history.

(56) References Cited

U.S. PATENT DOCUMENTS

2019/0095465 A1*  3/2019  Zhai ................... G06V 10/761
2024/0242260 A1*  7/2024  Shanker ............. G06Q 30/0631

OTHER PUBLICATIONS

Shiau, Raymond, et al., "Shop The Look: Building a Large Scale Visual Shopping System at Pinterest", arXiv:2006.10866v1, [Online]. Retrieved from the Internet: <URL: https://protect-us.mimecast.com/s/_kWjCmZGMvCpPDyrCGK2iB?domain=arxiv.org>, (2020), 10 pgs.

* cited by examiner

*Primary Examiner* — Dov Popovici
(74) *Attorney, Agent, or Firm* — SCHWEGMAN LUNDBERG & WOESSNER, P.A.

(57) ABSTRACT

Systems and methods are provided for segmenting each image of a first plurality of images, using an image processing segmentation technique, into one or more category of a plurality of predefined categories to generate a set of image segments for the image. A numerical vector representation is generated for each image segment and for each image in a second plurality of images and used to determine a similarity between image segments and images in the second plurality of images. Each image segment in each set of image segment are replaced with an image in the second plurality of images that is similar to the image segment to generate a recommendation catalog including a plurality of sets of recommendation images.

20 Claims, 7 Drawing Sheets

IMAGE SEGMENTATION AND VECTORIZATION SYSTEM FOR COMPLEMENTARY STYLING PRODUCTS

BACKGROUND

In an online-shopping experience, product recommendation systems rely on a large volume of past transactional data to learn co-occurrence patterns of product purchases. In many cases, however, the transaction data is insufficient.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
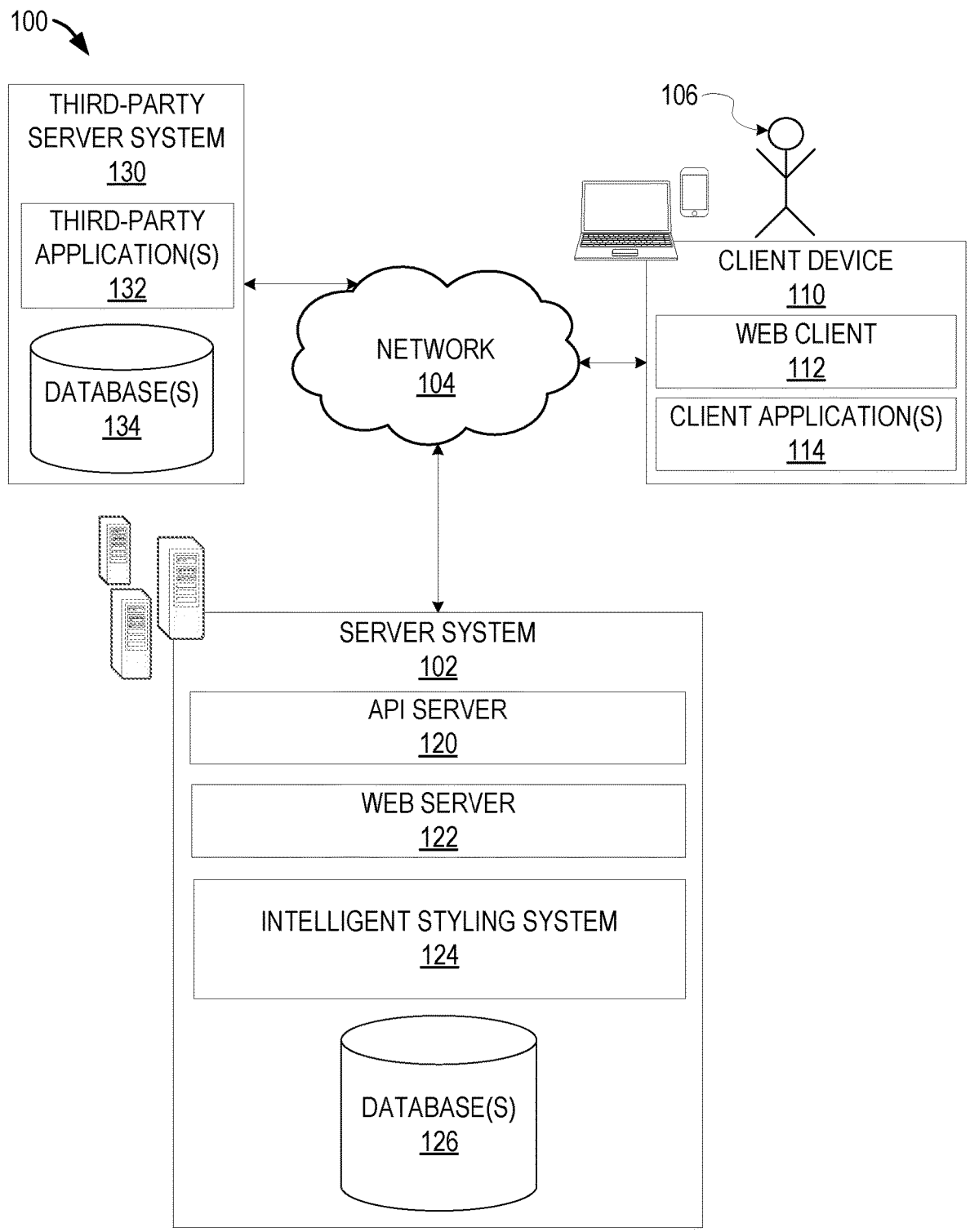
FIG. 1 is a block diagram illustrating a networked system, according to some example embodiments.

Systems and methods described herein relate to an intelligent styling system that generates a recommendation catalog that is used to generate complementary products based on a product of interest. As explained above, in an online-shopping experience, product recommendation systems rely on a large volume of past transactional data to learn co-occurrence patterns of product purchases. In many cases, however, the transaction data is insufficient. Moreover, trends change quickly and it is extremely difficult to show a whole fashion ensemble or home décor scene based transactional data.

For example, in an online-shopping experience, a user that has indicated an interest in purchasing a particular product or has purchased the particular product can be alerted to recommended products based on that particular product. These products are recommended based on purchase history. For example, the recommended products can be based on co-occurrence patterns of products that are purchased together. This may be useful if a system has a large amount of purchase data so that the system can determine these types of patterns, but it is not useful with a smaller amount of data. Moreover, new trends, such as in fashion and home décor, change very frequently and it is difficult to establish purchase patterns on a short-term basis. For instance, if a new trend has been around for only a week, there is not much data upon which to establish recommendations and thus, either recommendations cannot be provided or provided recommendation are out of date or irrelevant. Further, just because products are purchased together does not mean the products would work well together. For example, a first user may purchase a pair of pants for himself and a shirt for his partner. If a second user purchases the same pair of pants, it likely does not make sense to recommend the shirt that the first user purchased. Thus, typical recommendation systems fail to make useful recommendations which leads to a poor user experience for both an end customer and a merchant.

Embodiments described herein provide for an intelligent styling system that automatically identifies current style trends from visual data in public sources, such a social media (e.g., Instagram, Pinterest) or specific merchant websites or systems comprising style trends or images, to recommend products that can be styled with products of interest. For example, the intelligent styling system segments each image of a first plurality of images, using an image processing segmentation technique, into one or more category of a plurality of predefined categories to generate a set of image segments for the image. The intelligent styling system generates a numerical vector representation for each image segment and generates a numerical vector representation for each image in a second plurality of images, each image in the second plurality of images comprising a specific product. The intelligent styling system determines images in the second plurality of images that are similar to image segments from the first plurality of images by comparing the numerical vector representation for each image segment to the numerical vector representation for each image in the second plurality of images and replaces each image segment in each set of image segments with an image in the second plurality of images that is similar to the image segment to generate a recommendation catalog comprising a plurality of sets of recommendation images.

In this way the intelligent styling system provides an improved recommendation system that provides more accurate and timely recommended products that would be visually appealing to be styled with products of interest.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, utilize an intelligent styling system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for pushing a commit to update code in a project, an application for accessing and utilizing an intelligent styling system 124, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access an intelligent styling system 124, and so forth), and so forth. Conversely, one or more client applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and an intelligent styling system 124 that may be communicatively coupled with one or more databases 126.

The one or more databases 126 may be storage devices that store data related to users of the system 100, applications associated with the system 100, cloud services, machine learning models, parameters, and so forth. The one or more databases 126 may further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The intelligent styling system 124 may provide back-end support for third-party applications 132 and client applications 114, which may include cloud-based applications. The intelligent styling system 124 may provide for generating a recommendation or style catalog for an online marketplace, as explained in further detail below. The intelligent styling system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In another example, a third-party server system 130 is a system associated with an entity that accesses cloud services via server system 102.

The third-party database(s) 134 may be storage devices that store data related to users of the third-party server system 130, applications associated with the third-party server system 130, cloud services, machine learning models, parameters, and so forth. The one or more databases 126 may further store information related to third-party applications 132, client devices 110, client applications 114, users 106, and so forth. In one example, the one or more databases 134 is cloud-based storage.

Figure 2:
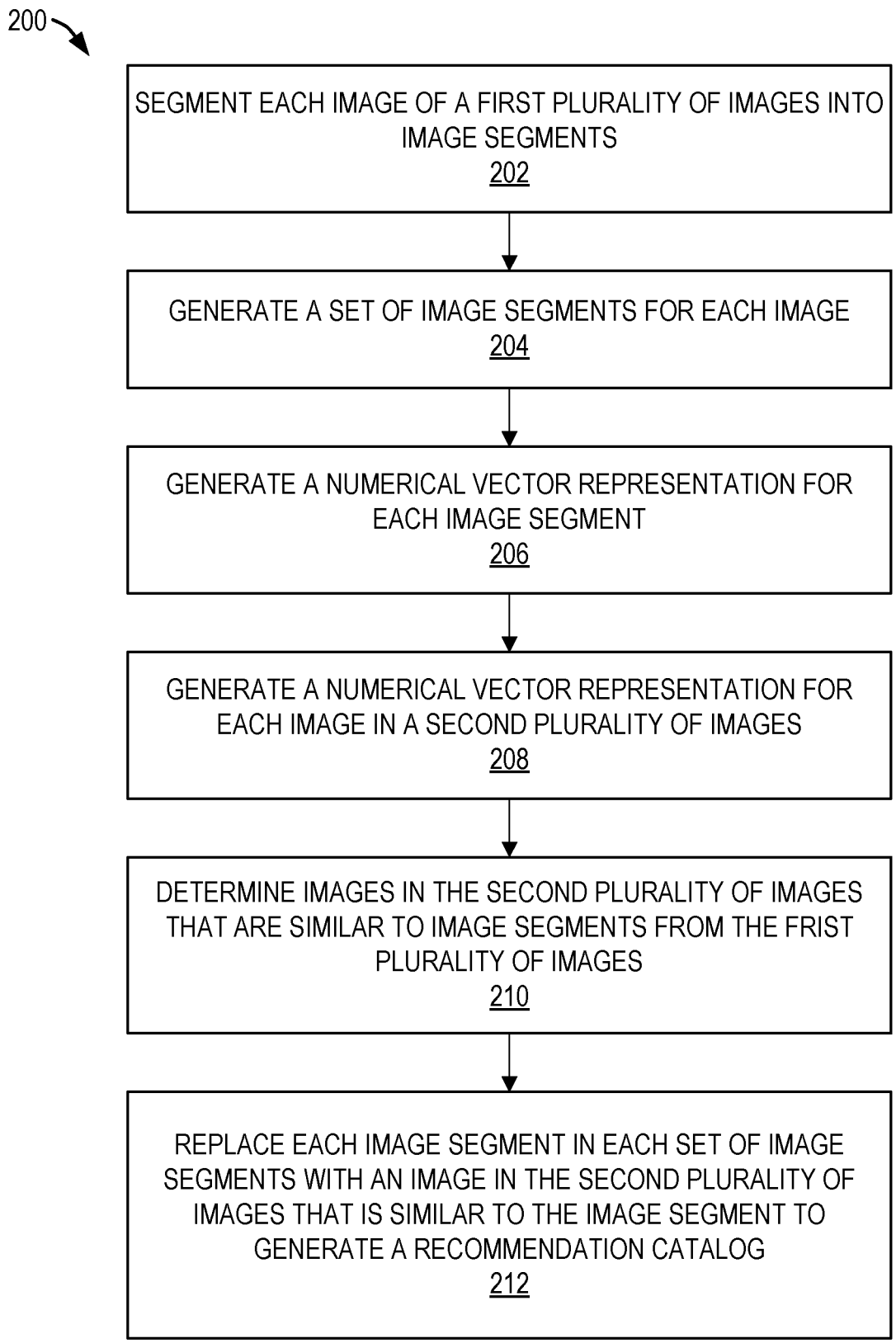
FIG. 2 comprises a flow chart illustrating aspects of a method, according to some example embodiments

FIG. 2 is a flow chart illustrating aspects of a method 200 for an generating a recommendation or style catalog based on visual data in images, according to some example embodiments. For illustrative purposes, method 200 is described with respect to the block diagram of FIG. 1. It is to be understood that method 200 may be practiced with other system configurations in other embodiments.

In operation 202, a computing system (e.g., server system 102 or intelligent styling system 124) segments each image of a first plurality of images into image segments. For example, the computing system accesses images from at least one public source of images, such as a merchant catalog, a social media source (e.g., Instagram, Pinterest), a website, or other public source of images. An example merchant catalog includes a clothing, accessory, home décor, or other product catalog. An example social media source or website includes a social media source or website that is related to clothing, accessories, home décor or other products and contains images of such products. The images in the public source of images may contain a fashion model wearing a particular outfit, a living room styled in a particular way, an arrangement of clothes and accessories, or other product scenarios. In one example, the computing system accesses the at least one public source of images at one or more third-party server system 130 or database(s) 134, or other system or database(s) via a network 104.

For each image of the first plurality of images, the computing system segments the image, using an image processing segmentation technique, into one or more category of a plurality of predefined categories to generate segments for the image. For example, an image may contain more than one product and thus, can be segmented into different parts of the fashion or décor shown in the image. The predefined categories can correspond to clothing and accessories, home décor, or other product categories. Some examples of categories include tops, bottoms, shoes, sunglasses, belts, rings, necklaces, couches, coffee tables, art, and so forth. Any image processing technique can be used to generate segments for an image, such as mask R-CNN or a service such as Clarifai.

In one example, a machine learning model (such as mask R-CNN) is trained using labeled data to segment and categorize objects in an image. The trained machine learning model is then used to analyze an image and output a bounding box and category for each object recognized in the image.

Figure 3:
FIG. 3 shows an example image, according to some example embodiments.
Figure 4:
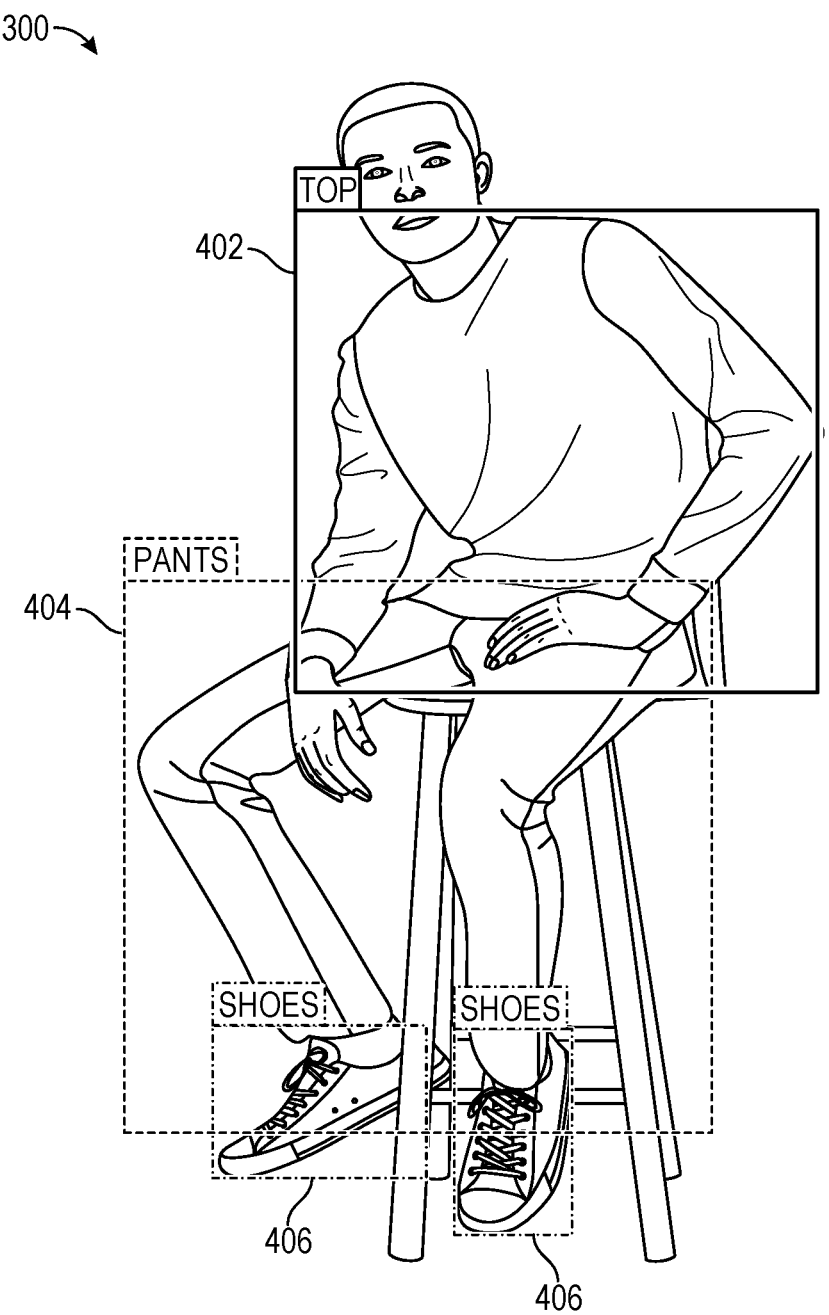
FIG. 4 shows an example segmentation of the image in FIG. 3, according to some example embodiments.

FIG. 3 illustrates an example image 300 that can be segmented into one or more category of the plurality of predefined categories. The example image 300 is a photograph of a person wearing a top, pants, and shoes. In one example, the image is input into a machine learning model trained to segment and categorize objects in an image. The machine learning model analyzes the image and outputs a bounding box and category for each object recognized in the image. Accordingly, the example image 300 can be segmented into a first segment 402 for a "top" category, a second segment 404 for a "pants" category, and a third segment 406 for a "shoes" category, as shown in FIG. 4. In one example, only parts (e.g., certain objects) of the image that correspond to one or more category of the plurality of predefined categories are segmented. There may be other items or products in the image that are not segmented, such as the stool shown in the example image 300.

Returning to FIG. 2, in operation 204, the computing system generates a set of image segments for each image. In one example, the computing system generates a set identifier for each image of the first plurality of image and associates the set identifier with each image segment for the image to generate a set of image segments for the set identifier. For example, the set identifier for the example image 300 can be "setID101" and each image segment 402, 404, and 406 is associated with setID101. Further, each image segment can have an image segment identifier. It is to be understood that setID101 is just an example format for a set identifier and that any format of identifier can be used in example embodiments for the set identifier and image segment identifier. Accordingly, the set of image segments 402, 404 and 406 are generated for the set identifier for the example image 300. In this way, each set of image segments is a style template indicating a set of products (e.g., image segments) that can be styled together.

In one example, the image segments are extracted from the respective image and stored individually, such as in one or more database(s) 126. For example, the image can be cropped based on the bounding box for the image segment and the cropped image comprising the object in the bounding box is stored individually. In one example, the set of image segments for an image comprises the extracted images segments.

In one example, a gender related to the products is also determined, using any image processing technique for identifying a gender from an image comprising a person and/or products. The gender can be associated with the set of image segments. In another example, a distinction between a child versus an adult is determined using any image processing technique for identifying a child versus adult from an image comprising a person and/or products. The child or adult distinction can be associated with the set of image segments.

In operation 206, the computing system generates a numerical vector representation for each image segment and in operation 208, the computing system generates a numerical vector representation for each image in a second plurality of images. Any image embedding technique can be used to generate the numerical vector representation, such as ResNet50, VGG-16, InceptionV3, EfficientNet, or the like. An image embedding is a representation (e.g., a numerical vector representation) of an image as a point in space. For example, each image (or image segment) can be represented as a point in n-dimensional space so that similar images (e.g., points) cluster together in the space. With the numerical vector representation or image embedding for each image, the computing system can determine similar images by determining the closest images and image segments (e.g., points) to a given image or image segment in the n-dimensional space, using a distance or similarity score, as explained further below. For instance, clothes with similar embeddings (e.g., black tops) would be clustered closer together in vector space.

In example embodiments, the number of dimensions for the n-dimensional space depends on a length of vector selected. A vector length can be any length and the vector length can be adjusted based on which length gives better results for generating clusters for a given dataset. For instance, a vector length of 2048 or 600 can be used when using word and image embeddings for an image. Each dimension of the vector can represent a different parameter including, for example, an outline or shape, a color, a pattern, and the like.

In one example, the second plurality of images correspond to product images in a merchant catalog. For example, a first merchant may wish to create a styling catalog for its recommendation engine in its online marketplace using images in its product (merchant) catalog.

In one example, the computing system also generates a category (e.g., textual) embedding and then combines the image embedding (numerical vector representation) with the category embedding to generate a more accurate prediction. In this way, the computing system can make use of additional information, such as category, as explained further below.

In operation 210, the computing system determines images in the second plurality of images that are similar to image segments from the first plurality of images. For example, the computing system compares the numerical vector representation for each image segment to the numerical vector representation for each image in the second plurality of images. In one example, this comprises determining a distance score (e.g., nuclear distance, Euclidean distance, cosine distance, Manhattan distance, Hamming distance, Dot (Inner) Product distance) for each pair of image in the second plurality of images and image segment. It is to be understood that any technique to determine a similarity (or similarity score) can be used in example embodiments. In one example, an image in the second plurality of images is determined to be similar to an image segment when the similarity or distance score is greater than a predefined threshold value.

In one example, the computing system uses the category (e.g., textual) embedding mentioned above to only compare a numerical vector representation for each image segment to each numerical representation for each image in the second plurality of images that have the same category. For instance, the computing system determines a subset of images of the second plurality of images that have the same category as an image segment, and then compares the numerical vector representation of the image segment to the numerical vector representation of each image of the subset of images of the second plurality of images to generate a distance or similarity score to determine the images that are similar to image segments.

Figure 5:
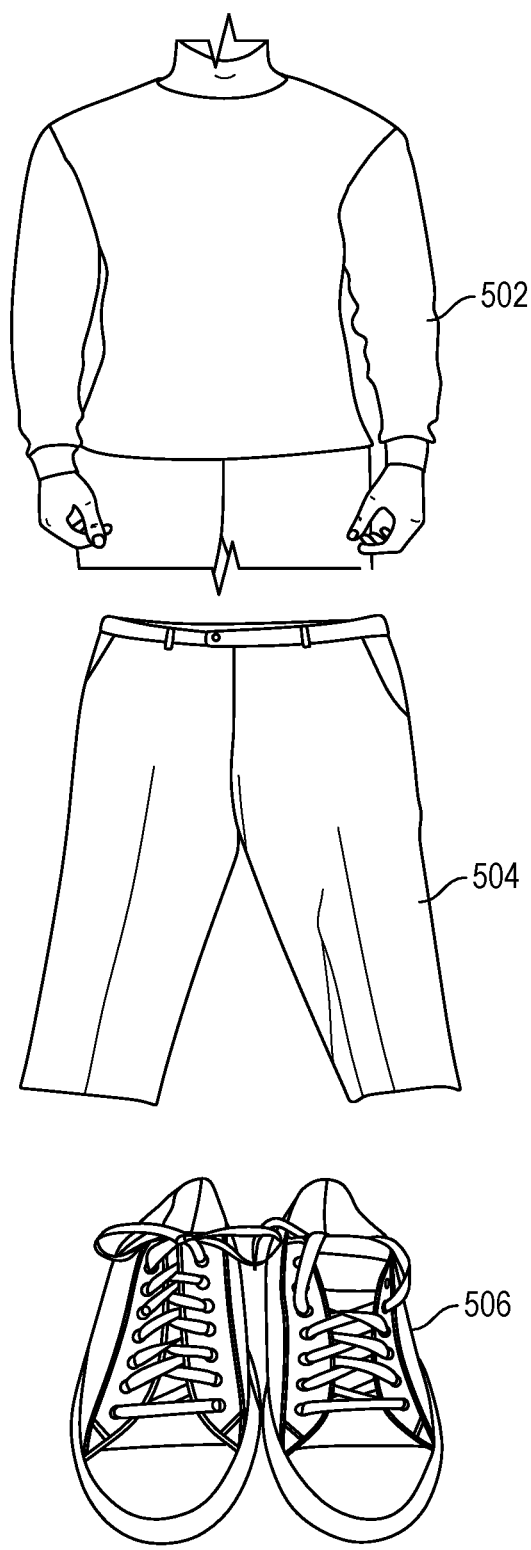
FIG. 5 shows an example set of images replacing the image segments from FIG. 3, according to some example embodiments.

In operation 212, the computing system replaces each image segment in each of the set of image segments with an image in the second plurality of images that is similar to the image segment to generate a recommendation or style catalog comprising a plurality of sets of recommendation images. Using the example image 300 in FIGS. 3 and 4, similar images found in the second plurality of images replace the image segments for the example image 300, as shown in the updated example set 500 of FIG. 5. In the example set 500, image 502 replaces image segment 402, image 504 replaces image segment 404, and image 506 replaces image segment 406, to generate set 500 in a recommendation or style catalog.

In one example, sets of images segments that do not have any image segments similar to any images in the second plurality of images can be discarded and not included in the recommendation catalog, such that the recommendation catalog only comprises products from the second plurality of images. In another example, sets of image segments that only have one or fewer than all of the images segments that are similar to images in the second plurality of images can be discarded and not included in the recommendation catalog.

The recommendation or style catalog can then be used in an online marketplace or system to provide recommendations. For example, a user can use a computing device (e.g., client device 110) to access the online marketplace via a merchant website, application, a social media application, or other means. The user can browse products or search for a particular product of interest (e.g., item of clothing, accessory, home décor, or other product) in the online marketplace via the computing device. When a user has selected or is viewing a particular product, the computing system can search the recommendation or style catalog to find an image of that product in a first set recommendation images that corresponds to the particular product (e.g., in real-time or near real-time). For example, if the user has selected or is viewing a black t-shirt, the computing system can search the recommendation or style catalog to find an image that corresponds to the black t-shirt product (e.g., by product identifier). For instance, the computing system can determine that the image 502 in set 500 matches the selected black t-shirt because they both have the same product identifier or other identifier that can be matched. The computing system can provide recommended images of products to be styled with the selected black t-shirt based on the image 502 in set 500 by providing images, other than the image 502, that are in the set 500. For instance, the computing system can provide images 504 and 506 as complementary products to the selected black t-shirt. The images 504 and 506 can be provided to the computing device to be displayed on a user interface of the computing device. These images can be selectable by the user via the user interface to view or purchase.

In some examples there may be more than one set of images that corresponds to an image of a product selected or viewed by a user. In this case, the computing system can provide images from each set that corresponds to the selected image as complementary products. In one example, each set is shown separately in the user interface to show how the selected product can be styled in different ways.

For example, the computing system can search the recommendation catalog to find a second image in a second set of recommendation images that corresponds to the at least one matching image and provide recommendation images, other than the second image, in the second set of recommendation images as complementary products to the at least one matching image.

The recommendation or style catalog can be updated on a periodic basis as new trends and styles come out. For example, the computing system can monitor one or more public sources of images for any new images or get alerts for new images from the one or more public sources. Once the computing system detects new images from at least one public source of images, the computing system can update the recommendation catalog based on the new images, as explained above with respect to operations 202-212.

In another example, the intelligent styling system can be used to identify products in an image and provide matching product information to a user via a user interface on a computing device. For example, the computing system can receive an image (e.g., of a person wearing a shirt that the user likes or of a living room in a magazine that the user likes) captured by the computing device and segment the captured image, using an image processing technique, into one or more category of a plurality of predefined categories to generate a set of image segments for the captured image, as explained above. The computing system compares each image segment of the set of image segments for the captured image to each image in the second plurality of images (e.g., merchant catalog) to find at least one matching or similar image in the second plurality of images, as explained above. The computing system provides the at least one matching image and product information about the at least one matching image to the computing device. The computing system can also provide complementary products to the product in the at least one matching image, as also explained above. In this way, the computing system can provide product information for a product in an image in real time or near real time.

In view of the above disclosure, various examples are set forth below. It should be noted that one or more features of an example, taken in isolation or combination, should be considered within the disclosure of this application.

Example 1. A computer-implemented method comprising:
  for each image of a first plurality of images:
    segmenting the image, using an image processing segmentation technique, into one or more category of a plurality of predefined categories to generate image segments for the image; and
    generating a set identifier for the image and associating the set identifier with each image segment for the image to generate a set of image segments for the set identifier;
  generating a numerical vector representation for each image segment;
  generating a numerical vector representation for each image in a second plurality of images, each image in the second plurality of images comprising a specific product;
  determining images in the second plurality of images that are similar to image segments from the first plurality of images by comparing the numerical vector representation for each image segment to the numerical vector representation for each image in the second plurality of images;

replacing each image segment in each set of image segments with an image in the second plurality of images that is similar to the image segment to generate a recommendation catalog comprising a plurality of sets of recommendation images;

searching the recommendation catalog to find a first image in a first set of recommendation images that corresponds to a selected product; and providing recommendation images, other than the first image, in the first set of recommendation images as complementary products to the selected product.

Example 2. A computer-implemented method according to any of the previous examples, wherein the image segments are extracted from a respective image and stored individually.

Example 3. A computer-implemented method according to any of the previous examples, wherein the set of image segments for an image comprises the extracted image segments.

Example 4. A computer-implemented method according to any of the previous examples, wherein segmenting the image, using an image processing segmentation technique, into one or more category of a plurality of predefined categories to generate image segments for the image comprises:

analyzing the image using a machine learning model trained to segment and categorize objects in an image to generate a bounding box and category for each object recognized in the image.

Example 5. A computer-implemented method according to any of the previous examples, wherein generating a numerical vector representation for each image segment and generating a numerical vector representation for each image in a second plurality of images comprises generating a representation of each image segment and each image in the second plurality of images as a point in n-dimensional space.

Example 6. A computer-implemented method according to any of the previous examples, wherein determining images in the second plurality of images that are similar to image segments from the first plurality of images by comparing the numerical vector representation for each image segment to the numerical vector representation for each image in the second plurality of images comprises determining a distance score for each pair of image in the second plurality of images and image segment.

Example 7. A computer-implemented method according to any of the previous examples, wherein an image in the second plurality of images is determined to be similar to an image segment when the distance score is greater than a predefined threshold value.

Example 8. A computer-implemented method according to any of the previous examples, wherein the first plurality of images comprise images from at least one public source of images including at least one social media source.

Example 9. A computer-implemented method according to any of the previous examples, further comprising:

detecting new images from the at least one public source of images; and updating the recommendation catalog based on the new images.

Example 10. A computer-implemented method according to any of the previous examples, further comprising:

receiving a captured image that was captured by a computing device;

segmenting the captured image, using an image processing segmentation technique, into one or more category of the plurality of predefined categories to generate a set of image segments for the captured image;

comparing each image segment of the set of image segments for the captured image to each image in the second plurality of images to find at least one matching image in the second plurality of images; and providing the at least one matching image and product information about the at least one matching image to the computing device.

Example 11. A computer-implemented method according to any of the previous examples, further comprising:

searching the recommendation catalog to find a second image in a second set of recommendation images that corresponds to the at least one matching image; and providing recommendation images, other than the second image, in the second set of recommendation images as complementary products to the at least one matching image.

Example 12. A system comprising:

a memory that stores instructions; and one or more processors configured by the instructions to perform operations comprising:

for each image of a first plurality of images:

segmenting the image, using an image processing segmentation technique, into one or more category of a plurality of predefined categories to generate image segments for the image; and generating a set identifier for the image and associating the set identifier with each image segment for the image to generate a set of image segments for the set identifier;

generating a numerical vector representation for each image segment;

generating a numerical vector representation for each image in a second plurality of images, each image in the second plurality of images comprising a specific product;

determining images in the second plurality of images that are similar to image segments from the first plurality of images by comparing the numerical vector representation for each image segment to the numerical vector representation for each image in the second plurality of images;

replacing each image segment in each set of image segments with an image in the second plurality of images that is similar to the image segment to generate a recommendation catalog comprising a plurality of sets of recommendation images;

searching the recommendation catalog to find a first image in a first set of recommendation images that corresponds to a selected product; and providing recommendation images, other than the first image, in the first set of recommendation images as complementary products to the selected product.

Example 13. A system according to any of the previous examples, wherein the image segments are extracted from a respective image and stored individually.

Example 14. A system according to any of the previous examples, wherein the predefined categories correspond to clothing and accessories or to home décor products.

Example 15. A system according to any of the previous examples, wherein generating a numerical vector representation for each image segment and generating a numerical vector representation for each image in a second plurality of images comprises generating a representation of each image segment and each image in the second plurality of images as a point in n-dimensional space.

Example 16. A system according to any of the previous examples, wherein determining images in the second plurality of images that are similar to image segments from the first plurality of images by comparing the numerical vector representation for each image segment to the numerical vector representation for each image in the second plurality of images comprises determining a distance score for each pair of image in the second plurality of images and image segment, and wherein an image in the second plurality of images is determined to be similar to an image segment when the distance score is greater than a predefined threshold value.

Example 17. A system according to any of the previous examples, wherein the first plurality of images comprise images from at least one public source of images including at least one social media source.

Example 18. A system according to any of the previous examples, the operations further comprising:
  detecting new images from the at least one public source of images; and
  updating the recommendation catalog based on the new images.

Example 19. A system according to any of the previous examples, the operations further comprising:
  receiving a captured image that was captured by a computing device;
  segmenting the captured image, using an image processing segmentation technique, into one or more category of the plurality of predefined categories to generate a set of image segments for the captured image;
  comparing each image segment of the set of image segments for the captured image to each image in the second plurality of images to find at least one matching image in the second plurality of images; and
  providing the at least one matching image and product information about the at least one matching image to the computing device.

Example 20. A non-transitory computer-readable medium comprising instructions stored thereon that are executable by at least one processor to cause a computing device to perform operations comprising:
  for each image of a first plurality of images:
    segmenting the image, using an image processing segmentation technique, into one or more category of a plurality of predefined categories to generate image segments for the image; and
    generating a set identifier for the image and associating the set identifier with each image segment for the image to generate a set of image segments for the set identifier;
  generating a numerical vector representation for each image segment;
  generating a numerical vector representation for each image in a second plurality of images, each image in the second plurality of images comprising a specific product;
  determining images in the second plurality of images that are similar to image segments from the first plurality of images by comparing the numerical vector representation for each image segment to the numerical vector representation for each image in the second plurality of images;
  replacing each image segment in each set of image segments with an image in the second plurality of images that is similar to the image segment to generate a recommendation catalog comprising a plurality of sets of recommendation images;
  searching the recommendation catalog to find a first image in a first set of recommendation images that corresponds to a selected product; and
  providing recommendation images, other than the first image, in the first set of recommendation images as complementary products to the selected product.

Figure 6:
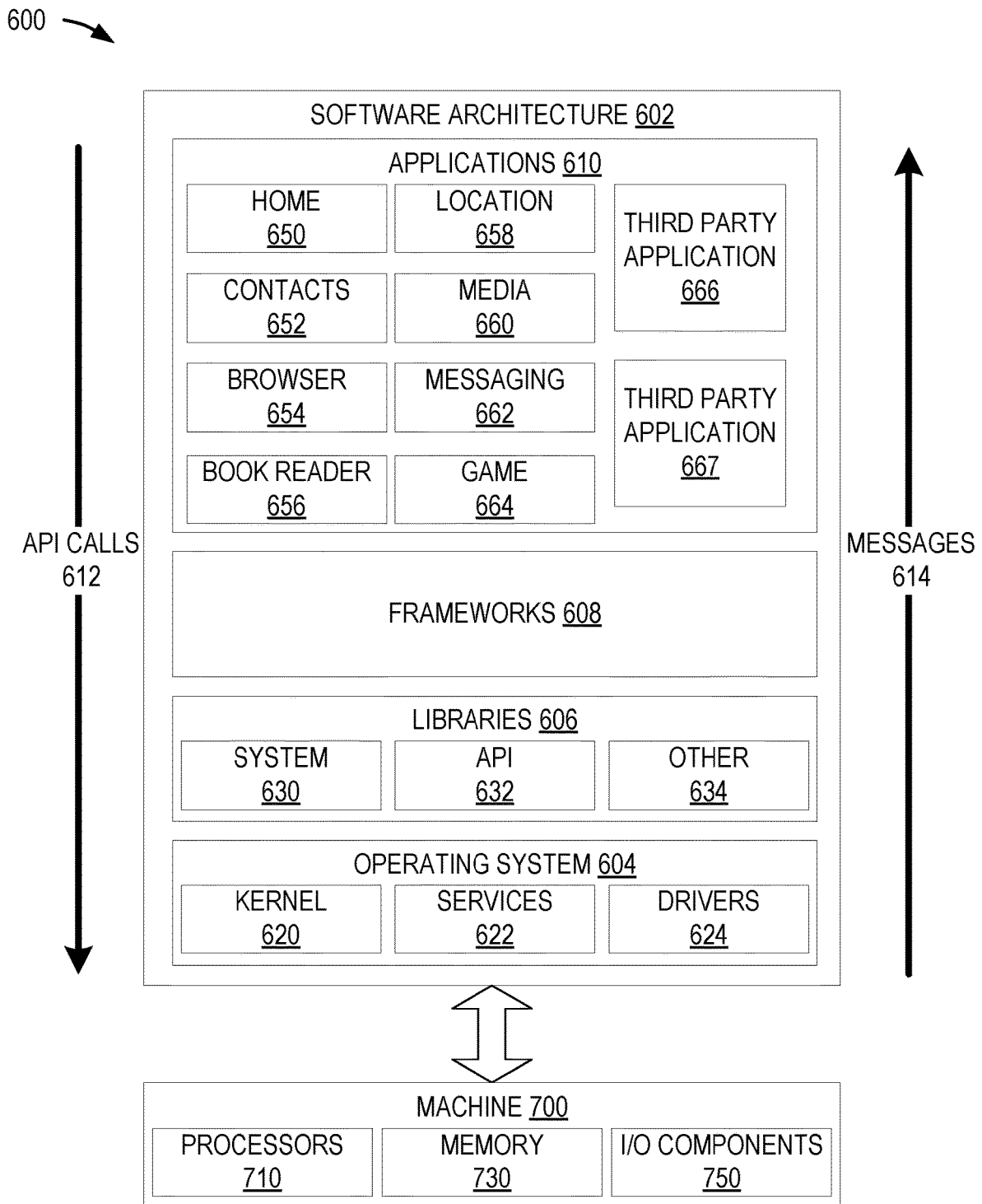
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
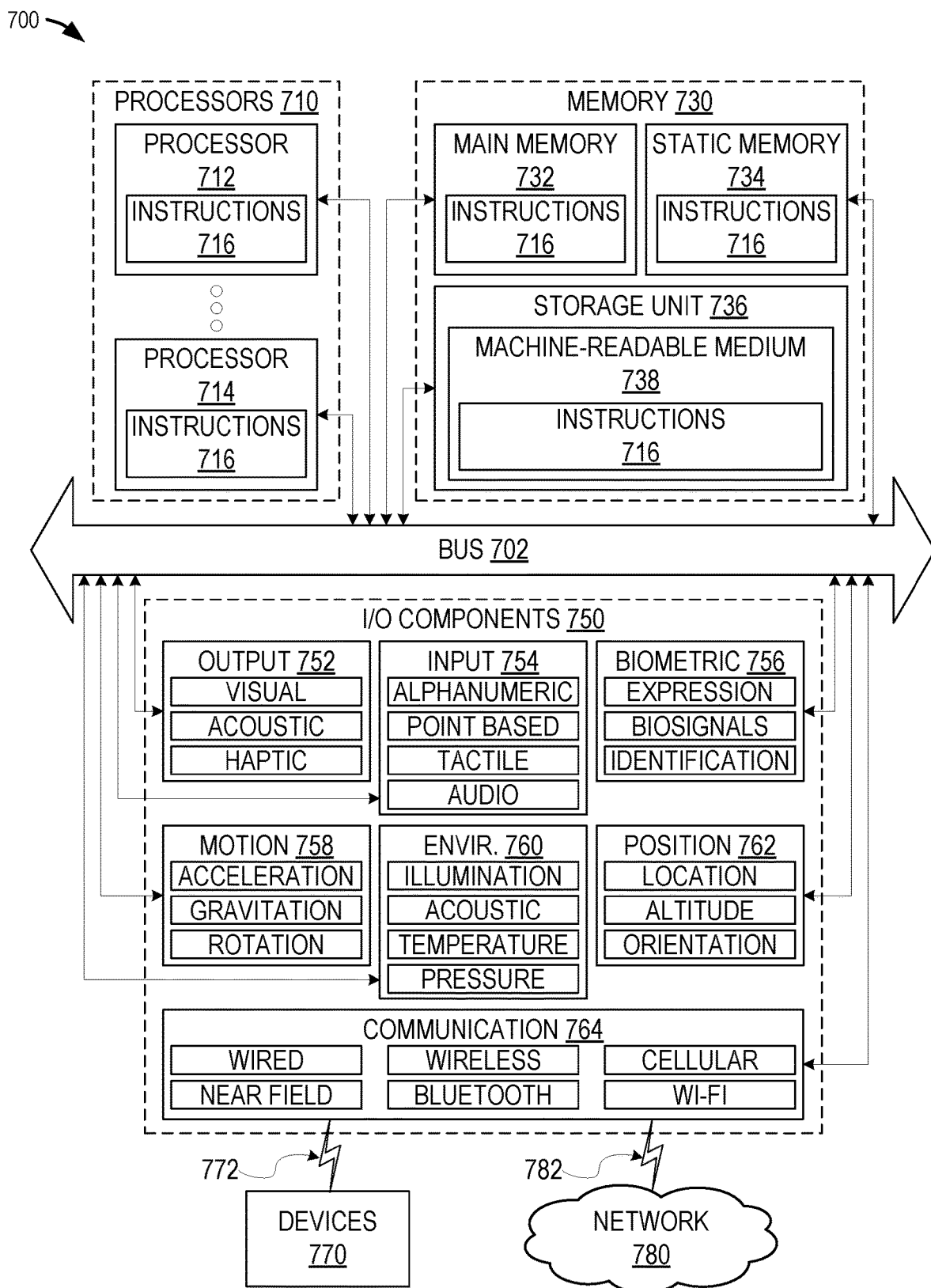
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   for each image of a first plurality of images:
      segmenting the image, using an image processing segmentation technique, into one or more category of a plurality of predefined categories to generate image segments for the image; and
      generating a set identifier for the image and associating the set identifier with each image segment for the image to generate a set of image segments for the set identifier;
   generating a numerical vector representation for each image segment;
   generating a numerical vector representation for each image in a second plurality of images, each image in the second plurality of images comprising a specific product;
   determining images in the second plurality of images that are similar to image segments from the first plurality of images by comparing the numerical vector representation for each image segment to the numerical vector representation for each image in the second plurality of images;
   replacing each image segment in each set of image segments with an image in the second plurality of images that is similar to the image segment to generate a recommendation catalog comprising a plurality of sets of recommendation images;
   searching the recommendation catalog to find a first image in a first set of recommendation images that corresponds to a selected product; and
   providing recommendation images, other than the first image, in the first set of recommendation images as complementary products to the selected product.

2. The computer-implemented method of claim 1, wherein the image segments are extracted from a respective image and stored individually, and
   wherein the set of image segments for an image comprises the extracted image segments.

3. The computer-implemented method of claim 1, wherein the predefined categories correspond to clothing and accessories or to home décor products, and
   wherein the second plurality of images corresponds to images in a merchant catalog and the specific product is an item of clothing or accessory or a home décor product.

4. The computer-implemented method of claim 1, wherein segmenting the image, using an image processing segmentation technique, into one or more category of a plurality of predefined categories to generate image segments for the image comprises:
   analyzing the image using a machine learning model trained to segment and categorize objects in an image to generate a bounding box and category for each object recognized in the image.

5. The computer-implemented method of claim 1, wherein generating a numerical vector representation for each image segment and generating a numerical vector representation for each image in a second plurality of images comprises generating a representation of each image segment and each image in the second plurality of images as a point in n-dimensional space.

6. The computer-implemented method of claim 1, wherein determining images in the second plurality of images that are similar to image segments from the first plurality of images by comparing the numerical vector representation for each image segment to the numerical vector representation for each image in the second plurality of images comprises determining a distance score for each pair of image in the second plurality of images and image segment.

7. The computer-implemented method of claim 1, wherein an image in the second plurality of images is determined to be similar to an image segment when a distance score is greater than a predefined threshold value.

8. The computer-implemented method of claim 1, wherein the first plurality of images comprise images from at least one public source of images including at least one social media source.

9. The computer-implemented method of claim 8, further comprising:
  detecting new images from the at least one public source of images; and
  updating the recommendation catalog based on the new images.

10. The computer-implemented method of claim 1, further comprising:
  receiving a captured image that was captured by a computing device;
  segmenting the captured image, using an image processing segmentation technique, into one or more category of the plurality of predefined categories to generate a set of image segments for the captured image;
  comparing each image segment of the set of image segments for the captured image to each image in the second plurality of images to find at least one matching image in the second plurality of images; and
  providing the at least one matching image and product information about the at least one matching image to the computing device.

11. The computer-implemented method of claim 10, further comprising:
  searching the recommendation catalog to find a second image in a second set of recommendation images that corresponds to the at least one matching image; and
  providing recommendation images, other than the second image, in the second set of recommendation images as complementary products to the at least one matching image.

12. A system comprising:
  a memory that stores instructions; and
  one or more processors configured by the instructions to perform operations comprising:
    for each image of a first plurality of images:
      segmenting the image, using an image processing segmentation technique, into one or more category of a plurality of predefined categories to generate image segments for the image; and
      generating a set identifier for the image and associating the set identifier with each image segment for the image to generate a set of image segments for the set identifier;
    generating a numerical vector representation for each image segment;
    generating a numerical vector representation for each image in a second plurality of images, each image in the second plurality of images comprising a specific product;
    determining images in the second plurality of images that are similar to image segments from the first plurality of images by comparing the numerical vector representation for each image segment to the numerical vector representation for each image in the second plurality of images;
    replacing each image segment in each set of image segments with an image in the second plurality of images that is similar to the image segment to generate a recommendation catalog comprising a plurality of sets of recommendation images;
    searching the recommendation catalog to find a first image in a first set of recommendation images that corresponds to a selected product; and
    providing recommendation images, other than the first image, in the first set of recommendation images as complementary products to the selected product.

13. The system of claim 12, wherein the image segments are extracted from a respective image and stored individually, and
  wherein the set of image segments for an image comprises the extracted image segments.

14. The system of claim 12, wherein segmenting the image, using an image processing segmentation technique, into one or more category of a plurality of predefined categories to generate image segments for the image comprises:
  analyzing the image using a machine learning model trained to segment and categorize objects in an image to generate a bounding box and category for each object recognized in the image.

15. The system of claim 12, wherein generating a numerical vector representation for each image segment and generating a numerical vector representation for each image in a second plurality of images comprises generating a representation of each image segment and each image in the second plurality of images as a point in n-dimensional space.

16. The system of claim 12, wherein determining images in the second plurality of images that are similar to image segments from the first plurality of images by comparing the numerical vector representation for each image segment to the numerical vector representation for each image in the second plurality of images comprises determining a distance score for each pair of image in the second plurality of images and image segment, and wherein an image in the second plurality of images is determined to be similar to an image segment when the distance score is greater than a predefined threshold value.

17. The system of claim 12, wherein the first plurality of images comprise images from at least one public source of images including at least one social media source.

18. The system of claim 17, the operations further comprising:
  detecting new images from the at least one public source of images; and
  updating the recommendation catalog based on the new images.

19. The system of claim 12, the operations further comprising:
  receiving a captured image that was captured by a computing device;
  segmenting the captured image, using an image processing segmentation technique, into one or more category of the plurality of predefined categories to generate a set of image segments for the captured image;
  comparing each image segment of the set of image segments for the captured image to each image in the second plurality of images to find at least one matching image in the second plurality of images; and providing the at least one matching image and product information about the at least one matching image to the computing device.

20. A non-transitory computer-readable medium comprising instructions stored thereon that are executable by at least one processor to cause a computing device to perform operations comprising:

for each image of a first plurality of images:
- segmenting the image, using an image processing segmentation technique, into one or more category of a plurality of predefined categories to generate image segments for the image; and
- generating a set identifier for the image and associating the set identifier with each image segment for the image to generate a set of image segments for the set identifier;

generating a numerical vector representation for each image segment;

generating a numerical vector representation for each image in a second plurality of images, each image in the second plurality of images comprising a specific product;

determining images in the second plurality of images that are similar to image segments from the first plurality of images by comparing the numerical vector representation for each image segment to the numerical vector representation for each image in the second plurality of images;

replacing each image segment in each set of image segments with an image in the second plurality of images that is similar to the image segment to generate a recommendation catalog comprising a plurality of sets of recommendation images;

searching the recommendation catalog to find a first image in a first set of recommendation images that corresponds to a selected product; and providing recommendation images, other than the first image, in the first set of recommendation images as complementary products to the selected product.

\* \* \* \* \*